United States Patent [19]

Butcher et al.

[11] Patent Number: 4,697,718
[45] Date of Patent: Oct. 6, 1987

[54] DIMENSIONALLY STABLE THERMOPLASTIC TUBULAR ARTICLES

[75] Inventors: Peter E. Butcher, Faringdon; David A. Dick, Wantage; James W. Nicholas, Wantage; Melvin E. R. Robinson, Wantage; Glyn Staines, Swindon, all of England

[73] Assignee: Metal Box P.L.C., Reading, England

[21] Appl. No.: 831,710

[22] Filed: Feb. 21, 1986

Related U.S. Application Data

[62] Division of Ser. No. 599,697, Apr. 12, 1984, Pat. No. 4,587,075.

[30] Foreign Application Priority Data

Apr. 22, 1983 [GB] United Kingdom ............... 8310966

[51] Int. Cl.$^4$ .......................................... B65D 25/54
[52] U.S. Cl. ............................. 220/82 R; 206/45.34; 264/230; 264/532
[58] Field of Search .................. 220/82 R; 206/45.34; 264/230, 235, 532, 525, 573

[56] References Cited

U.S. PATENT DOCUMENTS 2,974,825 3/1961 Ross .................................. 206/45.34

FOREIGN PATENT DOCUMENTS 150866 8/1985 European Pat. Off. .......... 220/82 R
99939 7/1980 Japan ............................... 220/82 R Primary Examiner—George E. Lowrance
Attorney, Agent, or Firm—Burns, Doane, Swecker & Mathis

[57] ABSTRACT

A food container comprising an open-ended cylindrical body which is made of a crystallizable polyethylene terephthalate material, and end closures at each end of the body forming with the body a closed container, the body material being biaxially oriented and the container body having been head-set, while restrained against radial or axial shrinkage, at a temperature between about 180° C. and about 240° C., whereby the container is able to withstand hot-filling, pasteurization or sterilization temperatures of up to about 120° C. without undergoing shrinkage of its linear dimensions by more than 3%.

1 Claim, 5 Drawing Figures

DIMENSIONALLY STABLE THERMOPLASTIC TUBULAR ARTICLES

RELATED APPLICATION

This application is a division of U.S. patent application Ser. No. 599,697 filed on Apr. 12, 1984, now U.S. Pat. No. 4,587,075.

BACKGROUND OF THE INVENTION

1. Field of the Invention

This invention relates to thermoplastic tubular articles made from crystallisable polymers and dimensionally stable up to a specific elevated temperature, which articles are particularly tubular bodies of saturated linear polyester materials such as polyethylene terephthalate, intended for processable food and beverage containers.

2. Description of the Prior Art

It is known that biaxial drawing of a thermoplastic saturated linear polyester material, such as polyethylene terephthalate, can improve its mechanical properties while inducing a degree of biaxial orientation and crystallisation, without impairing the clarity of the material. The material will, however, shrink if heated above the temperature at which it was drawn. It is known that the tendency of biaxially drawn polyester film material to shrink can be decreased by annealing the material under restraint, utilising temperatures in the range 150° C. to 230° C., the process being known as heat setting. Biaxial drawing is also effected, for example, in the stretch-blow moulding of polyethylene terephthalate bottles. Another method of forming biaxially oriented tubular articles which may be used as bodies for processable food containers is disclosed in our copending U.K.Patent Application No. 8037137, published under No. 2089276A. The forming process described therein involves longitudinal stretching and radial expansion under internal fluid pressure within a mould and is normally carried out at a temperature in the range from 75° C. to 120° C. The tubular bodies thereby produced are dimensionally stable up to the temperatures encountered in many container filling operations, but a heat-setting treatment is necessary if the containers are to be filled with hot product (e.g. at 80° C. to 100° C.) or are to be subjected to pasteurisation (at about 60° C. to 100° C.) or sterilisation (at about 120° C.). Without such a heat-setting treatment, the thermoplastic linear polyester material (e.g. polyethylene terephthalate) would shrink and distort to an unacceptable degree during the hot filling or processing, as a result of relaxation of strained portions of the material back into their preferred state in which the molecular chains are coiled rather than extended. In the heat-setting treatment described in Specification No. 2089276A, the tubular articles were held for a time at a temperature at least equal to, and preferably somewhat greater than, the sterilisation or pasteurisation temperature whilst restraining them from shrinking beyond their desired circumferential and longitudinal dimensions. The restraint was provided by internal fluid pressure, so as to set the strained, oriented amorphous portions of the polyester material by at least partial crystallisation and relaxation. Internal fluid pressure cannot be conveniently used when the tubes have been cut so as to be open at both ends, and it is not convenient to combine the heat-setting with the forming process of our Specification No. 2089276A because it would involve additional complication and extended process times.

European patent application published under No. 0081451 discloses a heat-setting process and apparatus for making closed-ended containers from PET. The process comprises deep-drawing a pre-heated sheet of PET into a heated female mould by means of a male plug, which is at a temperature below the glass transition temperature (Tg) of the PET. The mould is kept at a temperature above Tg, typically 140° C. Air pressure introduced around the plug is used to blow the plug-formed article into contact with the mould for heating it above Tg.

When it has been in contact with the mould for long enough to be heat-set, it is allowed to shrink back into contact with the plug which restrains it from further shrinkage and cools it to a temperature below the heat-set temperature. Contact between the heat-set article and the plug can be released by forcing air through an axial passage in the plug. In this process the heat-setting is essentially carried out while the article is held against the female mould by internal gas pressure, rather than when it is restrained from axial shrinkage by the plug. The heat-set operation cannot be carried out independently of the biaxial drawing, and is clearly not applicable for heat-setting open-ended tubes.

SUMMARY OF THE INVENTION

According to the present invention, there is provided a food container comprising an open-ended cylindrical body which is made of a crystallisable polyethylene terephthalate material. End closure means at each end of the body form with the body a closed container. The body material is biaxially oriented and the container body is heat-set, whilst restrained against radial or axial shrinkage, at a temperature between about 180° C. and about 240° C., whereby the container is able to withstand hot-filling, pasteurisation or sterilisation temperatures of up to about 120° C. without undergoing shrinkage of its linear dimensions by more than 3%.

The heat-setting operation is effected independently of the forming operation and does not cause problems therein. A residual linear shrinkage of up to 3% is usually found after heat-setting, but it can be eliminated by a further step of re-heating the article to the specific elevated temperature without internal restraint against shrinkage. Such residual shrinkage may be used to eliminate or reduce head space in the container.

The degree of dimensional stability which is achieved depends on the temperature to which the body is heated (the "heat-setting temperature") and the time for which the body is maintained at this temperature, and it may be adjusted to the particular requirements for which the containers are made. For example, if it is desired that the linear dimensions of the container should not alter by more than 3% when it is heated to a specific elevated temperature of 120° C., the body may be heated at 180° C. for a period of 1 to 5 minutes or, preferably, at 240° C. for 12 to 15 seconds.

BRIEF DESCRIPTION OF THE DRAWINGS

FIG. 5 is a perspective view of a thermally processable container of the invention with a body heat-set on a mandrel as shown in any one of FIGS. 1 to 4.

DETAILED DESCRIPTION

The illustrations in FIGS. 1 to 4 are particularly concerned with the production of tubular bodies of biaxially oriented polyethylene terephthalate (PET) for thermally processable food containers as illustrated in FIG. 5, which have end closures seamed to the ends of the body. The tubular bodies, open at both ends, are made from tubes of at least partly biaxially oriented PET produced by theprocess disclosed in our prior British Patent Application No. 8037137 (Publication No. 2089276A). As explained above, it is necessary to carry out a heat-setting treatment on the oriented PET tube to ensure that the containers will be able to withstand hot-filling, pasteurisation or sterilisation processes at temperatures of from 60° C. to 120° C., without unacceptable shrinkage. In practice, it is a requirement that the container bodies have sufficient dimensional stability to match the end closures in a precise manner for the production of gas-tight seams and to avoid stressing the seams excessively through subsequent shrinkage.

Figure 1:
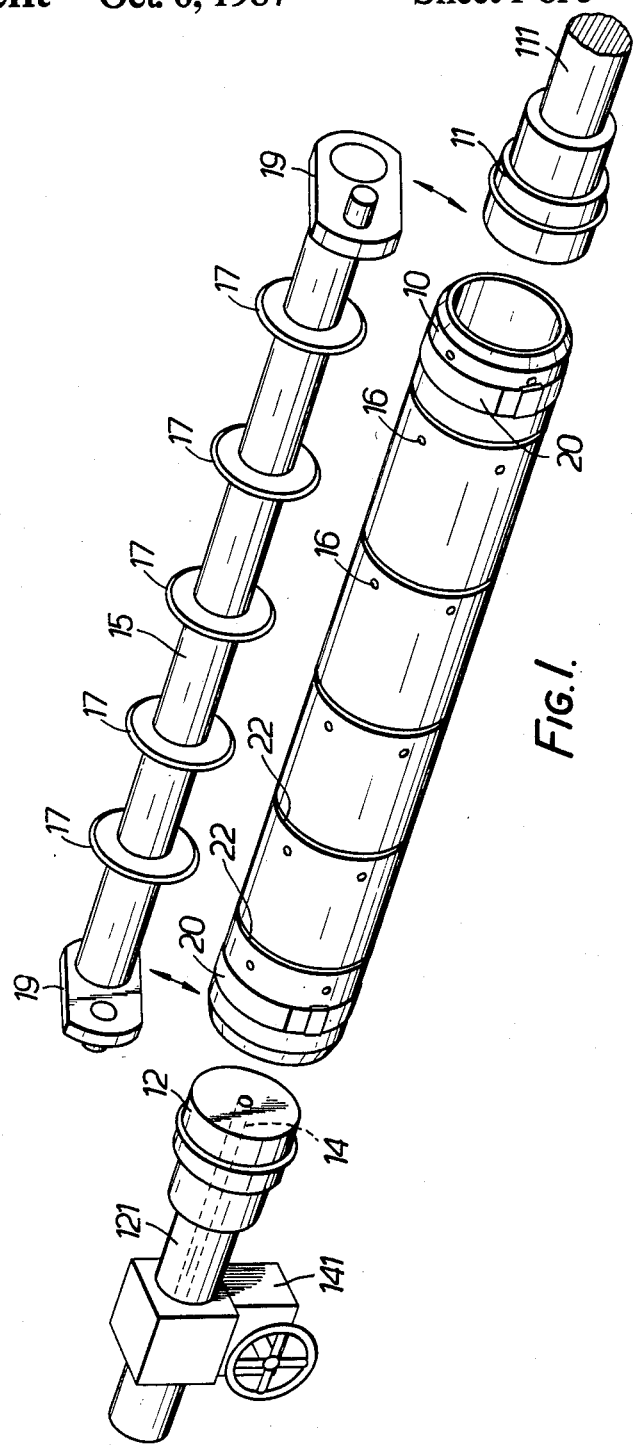
FIG. 1 is a diagrammatic perspective view of apparatus including a mandrel for use in heat-setting tubular bodies for making multiple container bodies by the method of the invention.

FIG. 1 illustrates apparatus including a mandrel on which the heat-setting process can be carried out. The cylindrical mandrel body 10 is hollow and its ends are closed by end plugs 11 and 12 carried by rotatable shafts 111 and 121 which can be shifted axially to enable the mandrel to be removed. Plug 12 and shaft 121 have an inlet passage 14 and control valve 141 for compressed air. The mandrel body 10 is provided with a plurality of small holes 16 in its surface. At each end, it is provided with a circumferential clamp member, e.g. in the form of a snap-action clip or clamping band 20. Circumferential grooves 22, approximately 1 mm. in width, are formed in the surface of the mandrel body 10 at intervals corresponding to the length of the container bodies to be produced. A shaft 15 carrying rotary knives 17 is mounted parallel to the mandrel 10 on pivotal brackets 19 so as to be capable of being shifted towards the mandrel so that the knives 17 can enter into the grooves 22.

Figure 2:
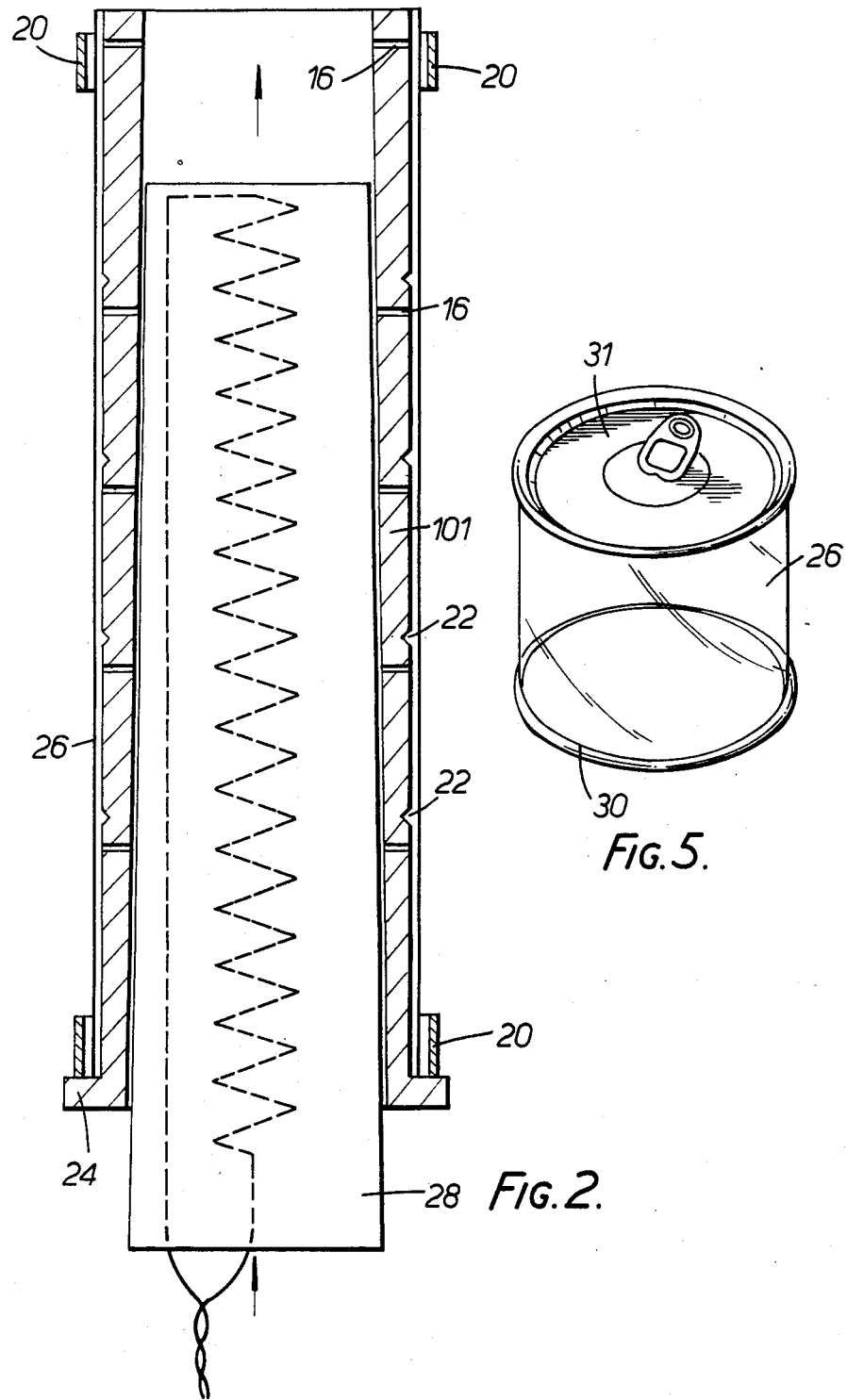
FIG. 2 is a diagrammatic sectional view of a modified form of the mandrel, showing a heating element inserted therein.

FIG. 2 illustrates an alternative form of mandrel body 101 in the vertical position. The foot of the body 101 has a flange 24 to support a tube 26 of at least partially biaxially oriented PET resin. The outer diameter of the mandrel body 101 is clearly shown to be only very slightly less than that of the PET resin tube 26, so that the latter can be fitted thereover without excessive friction but also without substantial play. In this embodiment, the mandrel body 101 is made of a material of high thermal conductivity but is sufficiently thin in section to have a small thermal capacity. The interior of the mandrel body 101 is slightly tapered towards the top so as to make contact with a correspondingly shaped heating element 28 when the latter is inserted from below, as shown in FIG. 2, to fill the interior of the mandrel.

Figure 3:
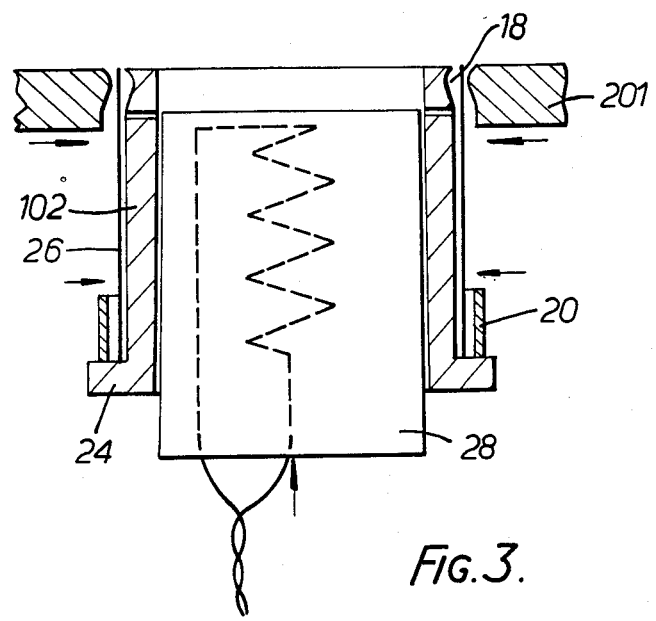
FIG. 3 is a view similar to FIG. 2 of a further form of mandrel for heat-setting single container bodies.

FIG. 3 illustrates a mandrel body 102 which is similar to that of FIG. 2 but of lesser height, for production of single container bodies. In this case, a circumferential groove 18 is provided at the upper end of the mandrel body 102 to co-operate with clamping members 201 in the form of laterally movable half-rings.

In use of the mandrels of FIGS. 1 to 3, when a PET tube 26 has been fitted over the mandrel body 10, 101 or 102, and the ends of the tube 26 have been clamped by means of clamp members 20, the temperature of the mandrel and tube is raised, e.g. by introduction of the heating member 28 of FIGS. 2 and 3, from an initial temperature below the glass transition temperature of the resin to a temperature which is at least 60° C. above the specific elevated temperature, up to which the can bodies are to be dimensionally stable. The temperature to which the mandrel is heated may range from 125° C. to 240°0 C., for heat-setting the PET tube up to specific elevated temperatures ranging from 65° C. to 180° C., but it is preferably from 180° C. to 240° C., at which the rate of annealing of the PET resin is sufficiently high to obtain rapid heat-setting. Using a temperature of 240° C., it is only necessary to ensure that the whole of the PET resin attains this temperature for about 12 to 15 seconds. Temperatures above 240° C. should preferably not be used because the material can become cloudy and embrittled. The PET tube 26 shrinks radially from any into contact with the mandrel 10, 101, or 102 but is restrained substantial radial or axial shrinkage by the mandreland the clamps 20, 201. The supply of heat is then stopped, e.g. by withdrawing the heating member 28, and the tube and mandrel are then allowed to cool to a temperature below the said specific elevated temperature (i.e. the temperature to which the tube has been heat-set).

In the cases of FIGS. 1 and 2, the mandrel bodies 10, 101 are now rotated and the knives 17 (FIG. 1) are brought into contact with the rotating PET tube 26 so as to penetrate through the tube material into the circumferential grooves 22 and thereby cut the tube into individual can body lengths. In the case of FIG. 3 this step is unnecessary, but the groove 18 and clamp members 201 form a circumferential groove in the top of the body to facilitate subsequent seaming of an end closure to it.

Finally the clamp members 20, 201 are released, the ends of the mandrel body 10, 101, 102 are sealed, e.g. by the end plugs 11, 12 of FIG. 1, and compressed air is admitted into the mandrel body, e.g. through the valve 141 and inlet 14, being then forced out of the holes 16 so as to release contact between the tube and mandrel by an air cushion effect. The can body or body sections are then removed from the mandrel.

Figure 4:
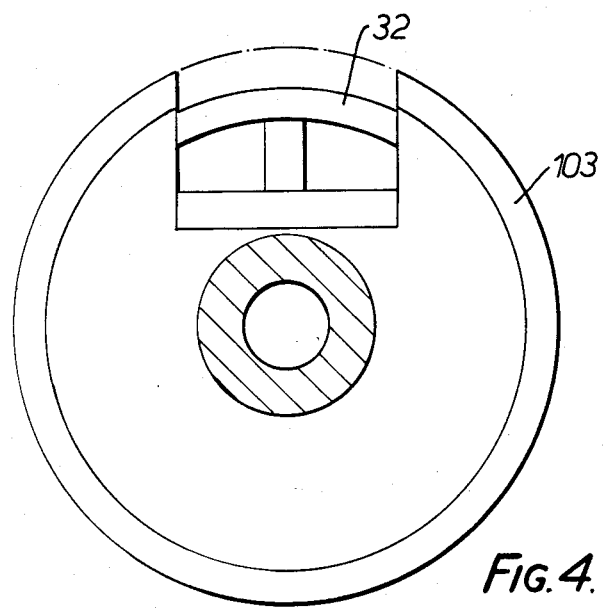
FIG. 4 is a diagrammatic cross-sectional view showing a modification of the mandrels of FIGS. 1, 2 or 3.

Instead of using compressed air to release the contact between the tube and mandrel, a part of the mandrel surface may be collapsed inwards as shown in FIG. 4. The mandrel body 103 is here provided with one or more sections 32 extending the whole length of the mandrel and movable radially from the position shown in chain-dotted lines to that shown in full lines to collapse a part of the mandrel surface, so reducing the effective circumference and releasing contact with a PET tube which has been heat-shrunk thereon. An alternative type of collapsible mandrel which could be used is a hydraulically or pneumatically inflated tube, e.g. of silicon rubber.

As shown in FIG. 5, can ends 30, 31, e.g. of metal, can conveniently be seamed to the ends of the heat-set tubular canbody 26 to form a processable container.

In production, a plurality of mandrel bodies 101 or 102 are arranged vertically on an indexing platform so as to be indexed past stations at which the various operations are carried out, as follows:

(a) a PET tube (26) is fitted over a mandrel body 101 or 102 while the temperature of the mandrel is below the glass transition temperature of the resin, (b) the circumferential clamps 20, 201 are applied to each end of the PET tube 26, (c) the heating element 28 is introduced from below into the interior of the mandrel body so as to make contact with it and to heat it rapidly by conduction to a temperature of 180° C. to 240° C., (d) this temperature is maintained for long enough to ensure the required heat-setting, (e) the heating element 28 is removed and the PET tube 26 is allowed to cool to below 140° C., (f) where a multiple-length mandrel body 101 is used, the mandrel body is rotated and knives are brought into contact with the tube 26 to cut it into individual lengths, (g) the ends of the mandrel body 101 or 102 are sealed and compressed air is introduced to release contact between the tube 26 and mandrel body, and (h) the can body sections are removed from the mandrel body.

Alternative means of heating the PET tube may be used such as inductive heating of a metal mandrel, using an induction coil within the mandrel. Dielectric radio-frequency heating of the PET tube may be employed, using inner and outer electrodes, the mandrel then forming a heat sink to receive heat from the PET tube as it cools down. Radiant heat, e.g. in the infra-red region, may be used, or the mandrel and tube may be introduced into a fluidised bed maintained at the desired temperature.

Other alternatives are heating of the interior of the mandrel by flame, and interior or exterior heating by hot air or by live steam.

What is claimed is:

1. In a food container comprising an open-ended cylindrical body which is made of a crystallisable polyethylene terephthalate material, and end closure means at eahc end of said body forming with said body a closed container, said body material being biaxially oriented and the container body having been heat-set, whilst restrained against radial or axial shrinkage, the improvement residing in that the container body has been heat-set at a temperature between about 180° C. and about 240° C., whereby said container is able to withstand hot-filling, pasteurisation or sterilisation temperatures of up to about 120° C. without undergoing shrinkage of its linear dimensions by more than 3%.

* * * * *